Dec. 9, 1952
R. M. NARDONE
2,620,627
GAS-DRIVEN ENGINE STARTING MOTOR
USING SOLID FUEL CARTRIDGES
Filed July 26, 1946
3 Sheets-Sheet 3
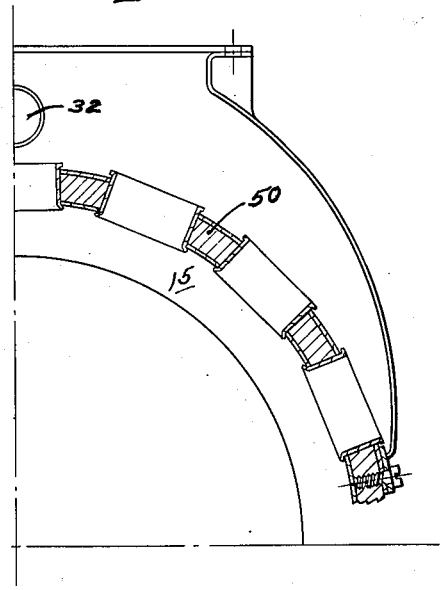
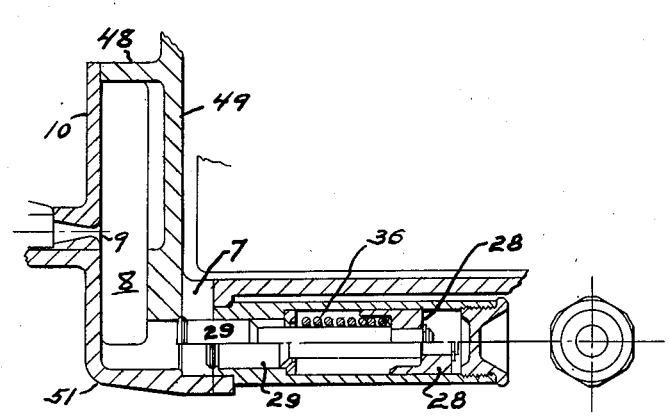
INVENTOR.
ROMEO M. NARDONE
BY
Martin J. Finnegan
ATTORNEY Patented Dec. 9, 1952

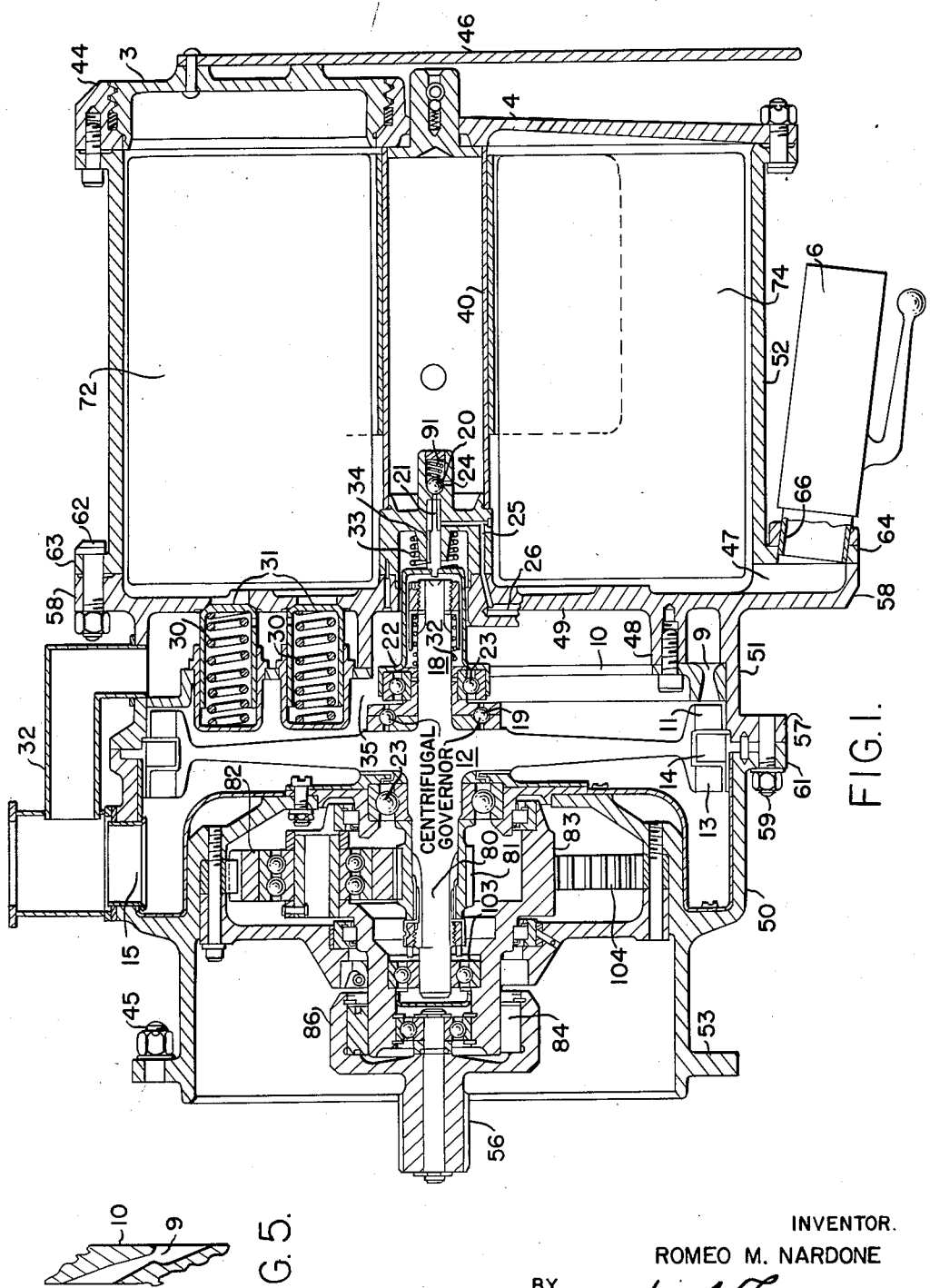

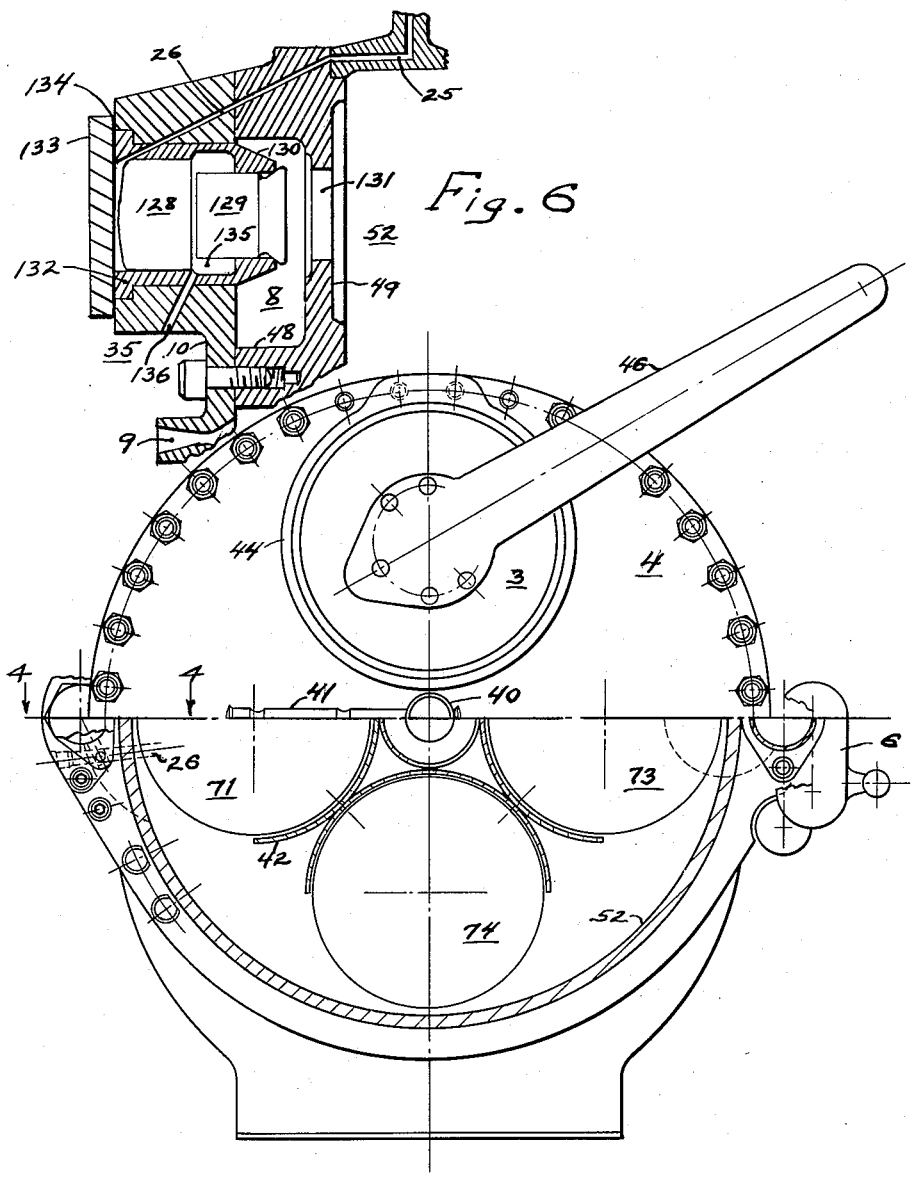

2,620,627

UNITED STATES PATENT OFFICE 2,620,627

GAS-DRIVEN ENGINE STARTING MOTOR USING SOLID FUEL CARTRIDGES

Romeo M. Nardone, Teaneck, N. J., assignor to Joseph J. Mascuch, Maplewood, N. J.

Application July 26, 1946, Serial No. 686,370

3 Claims. (Cl. 60—39.47)

This invention relates to engine starting mechanism, and particularly to the starting of engines in the high speed, high power category as, for example, gas turbines for aircraft jet propulsion and similar applications calling for development of a large reservoir of energy to be converted into turning effort to overcome the great static inertia of such turbines, as well as to produce the necessary acceleration of such a turbine to a speed sufficient to insure maintenance of an adequate supply of compressed gases and fuel to the combustion area of the turbine, wherefore continuity of the power output is assured.

An object of the invention is to provide a novel source of power for initial energization of gas turbines, or other engines of similar resistivity to starting efforts.

Another object of the invention is to provide novel means for controlling the application to the engine of the power developed externally thereof. In this connection, a feature of the invention is the concept of applying some starting energy while additional starting energy is still being generated. A corollative feature is the control of the energy transfer in such manner as to tend to maintain the energy flow constant, or substantially so, by placing a maximum speed limit upon the starting mechanism and at the same time providing for continuing energy generation and delivery to said starting mechanism, so that the speed of the latter, and hence the energy flow to the engine to be accelerated, never falls too far below the pre-selected maximum rate; the operation being such as to replenish the energy supply before the speed can fall to such a low point, and to repeat this process as often as is necessary to complete the engine accelerating cycle.

A further object of the invention is to provide a novel method of combining two sources of energy, one of relatively great capacity but difficult to control as to the release of its latent power, and the other of much smaller capacity but more readily controllable; the novel method further including the step of inter-relating the two said energy sources in such manner that the energy released from the smaller of the two energy sources is employed as the activating agency for release of the much greater reservoir of energy constituted by the second source.

In the embodiment of the invention disclosed herein, the first source of energy is a powder cartridge of the readily ignitable, multiple pellet type, similar to that disclosed in Coffman Patent No. 2,208,496, while the second source is a set of four sticks of a homogeneous, slow burning nitrocellulose composition whose component particles are compacted into a mass of relatively high density, so as to be substantially free of cracks or fissures anywhere throughout the mass constituting each stick; the size of each stick being many times that of the cartridge that is employed as the igniting agency therefor, and there being preferably two dissimilar coatings on different surfaces of each stick: a restricting, insulating coating on all surfaces except one end surface, and a readily ignitable coating on said one end surface—to the end that the burning of the relatively massive powder sticks may be more accurately regulated, and premature ignition thereof averted.

Another object of the invention is to provide a novel engine starting mechanism, a feature of which is the use of multiple stages for the expansion of the gases generated by the burning powder. To this end the invention includes the provision of a turbo-rotor of novel construction, with two or more sets of peripherally disposed gas receiving buckets, and a circular stator having a set of reaction buckets interposed between each pair of rotor bucket assemblies, to re-direct against the rotor the gases impinging thereagainst after issuing from the first set of rotor buckets; this multiple application of gaseous energy to the rotor being effective to build up in said rotor a sufficient supply of kinetic energy to assure successful "breaking away" of the main shaft of the gas turbine or other engine to be started.

Another object is to provide novel valve mechanism for control of the gas supply to the turbo-rotor, so as to maintain said turbo-rotor at or near a predetermined maximum operating speed, and to prevent over-speeding thereof.

A further object is to provide novel means for transferring to the engine to be started the rotational effort of the turbo-rotor, such means including unidirectional clutch mechanism operating to permit the starter assembly, after completion of the starting function, to decelerate to a condition of rest, even though the accelerated engine remains in geared connection therewith.

These and other objects of the invention will be further explained in the following description, which makes reference to the accompanying drawings wherein:

Fig. 1 is a longitudinal sectional view of a starter assembly embodying the invention;

Fig. 2 is a transverse view of the assembly of Fig. 1, the view including sections of the interior and sections of the exterior;

Fig. 3 is a transverse view of a section of the exhaust manifold;

Fig. 4 is a longitudinal sectional view of one of the control valve assemblies, as seen along line 4—4 of Fig. 2; and Fig. 5 is a diagram showing the dimensions of each entrance nozzle, as viewed along its individual longitudinal axis, and showing the degree of pitch of these nozzles in relation to the surface of the plate in which they are machined, and Fig. 6 is a sectional view of an alternate form of control valve assembly.

The starter, as shown, includes a series of cylindrical housing sections 50, 51, and 52, the section 50 having a flange 53 registrable with a similar flange (not shown) on the housing of the engine to be started; bolts 54 being insertible through bolt-holes in these flanges to constitute the means whereby the entire starter assembly is supported on the engine to be started, and in such position as to produce a condition of driving relationship between the starter pinion 56 and a similarly internally toothed shaft (not shown) mounted on, or in driving relation to, the main drive shaft of the engine to be started.

Central section 51 of the starter housing has two flanges, 57 and 58, the former receiving bolts 59 for attachment to flange 61 of housing section 50, and the flange 58 receiving bolts 62 for attachment of flange 63 of housing section 52. Flange 63 also carries a boss 64 having a sloping aperture to receive the spout portion 66 of a breech mechanism 6 adapted to receive a powder cartridge of the type disclosed in the above-identified Coffman Patent No. 2,208,496. As above explained, the gases generated upon firing of this relatively low capacity cartridge provide the heat and pressure which serve as the igniting agency for the four powder sticks 71, 72, 73, and 74, the latter being successively inserted in housing section 52 through an opening normally closed by cover element 3 shown in both Figs. 1 and 2. After the first powder stick is inserted, center spindle 40 is rotated ninety degrees by lever 41, which rotation brings a second compartment (as, for example, compartment 42, Fig. 2) into alignment with the opening in end plate 4 of the housing. A second powder stick is then inserted, and the process is repeated until all four sticks have been positioned in housing section 52. Cover element 3 is then screwed on to the threaded lip 44 of the opening in end plate 4; the long lever 46 being useful as a means of exerting strong tightening pressure, to preclude any possibility of a blowing off of the cover 3 by the pressure generated upon burning of the powder sticks in the course of operation of the starter.

It is, of course, to be understood that in lieu of four powder sticks, the number may be two, three, five, or any other number preferred. Likewise, other variations may be resorted to within the scope of the appended claims; the disclosed embodiment of the invention being merely illustrative and not definitive of its limits.

Upon firing of the cartridge in breech 6, the resulting hot gases pass into housing section 52 by way of entrance port 47, Fig. 1. These hot gases ignite the highly inflammable film of black powder which is provided on the forward end surface of each powder stick. From this initial ignition the burning of the main charge proceeds, the rate of burning being relatively slow, and the building up of pressure by the resulting gas generation being relatively gradual. The generated gases are directed through a passageway 7 (see Fig. 4) normally open to a manifold 8 leading to a series of Venturi nozzles 9 machined in a circular plate 10 (Fig. 1) carried by a boss 48 on transverse wall 49 of central housing section 51. These gases attain high velocity as they issue from nozzles 9 and impinge upon a set of buckets 11 integral with the turbo-rotor 12. As the rotor 12 is freely mounted on ball bearing assemblies 23 and 103, the effect of the gas jets is to begin the acceleration of the said rotor 12, and hence of the engine-engaging pinion 56, by way of the intervening planetary transmission elements 81, 82, 104, 83, and 84, the latter being a unidirectional clutch having sprags to transmit rotary effort to the drum extension 86 of shaft 56, while permitting over-running of the latter when sufficiently accelerated.

In addition to the buckets 11, turbo-rotor 12 is equipped with a second set of buckets 13, the latter receiving the gases after they have reacted against the stationary buckets 14 formed on a ring which is held to the housing by dowels, as shown in Fig. 1. These stationary buckets redirect the gases into the buckets 13, where they are effective to impart additional rotational effort to the rotor 12, thus further accelerating the starting action. The spent gases then emerge to the atmosphere by way of manifold 15.

The invention, as above stated, includes novel means for controlling the gas supply, so as to prevent over-speeding of the rotor 12 and at the same time tend to maintain the starter in operation at a speed which will not dip too far below the maximum at any time during the starting cycle. As shown, the control includes a centrifugal governor 19, 23, 22 surrounding hub 18 of rotor 12. Under the action of centrifugal force balls 19 move outwardly, in a radial direction, and in so doing they cause ball bearing assembly 23, thimble 22 and plunger 21 to shift to the right, as viewed in Fig. 1. This rightward shift compresses spring 33, and also moves ball valve 20 off its seat. The generated gases, the pressure of which remains constant as the burning of the powder proceeds, now pass through a series of channels leading to the piston shown at 28 in Fig. 4; these passages being identified in Fig. 1 by the numerals 24, 25, and 26. The pressure thus exerted on piston 28 causes the latter to move to the left, compressing spring 36, and causing plunger valve 29 to close off the passageway 7 by which the gases pass to the chamber 8 for action upon the rotor 12. Thus there is established a temporary stoppage of the energy supply to the rotor, allowing it to decelerate slightly. Meanwhile, pressure builds up in housing 52, for the gas generation process is continuing. Soon this pressure becomes sufficient to open relief valves 31 against the opposition of spring 30, and the dumping of excess gases to exhaust port 32 occurs. Concurrently, the deceleration of rotor 12 lessens the centrifugal urge upon balls 19, and spring 32 becomes effective to restore the balls to their normal setting. Simultaneously spring 33 returns thimble 22, and spring 91 returns ball valve 20 to its seat. As ball valve 20 returns to its seat it returns plunger 21 to its normal position (shown in Fig. 1) in which position passage 34 is uncovered at its left end, allowing free flow, into the large lower pressure chamber 35, of the gases which had theretofore been confined between piston 28 and plunger 21 by reason of the relatively greater pressure in the burning chamber 52. The release of these gases from the region of piston 28 permits expansion of spring 36, thereby returning plunger valve 29 from the blocking position illustrated in the upper half of Fig. 4, to the open position shown in the lower half of Fig. 4, and flow of high pressure gases from chamber 52 to the nozzles 9, by way of passage 7 and manifold 8, is resumed. This resumption of energy transfer to the buckets of rotor 9 causes a re-acceleration thereof to the point of maximum predetermined speed, at which point centrifugal force will again act to shift balls 19 and produce a repetition of the control cycle; such repetitions continuing until all powder in sticks 71 to 74 has been consumed. As this occurs, however, the transfer of rotational effort by way of pinion 56 will have accelerated the main shaft of the engine to be started (not shown) to such a degree as to render the said engine self-sustaining, by reason of the development of the fuel combustion action thereof to a stage approaching normal. In fact, the engine by this time will have produced its own acceleration to a degree exceeding the maximum speed of starter shaft 80, wherefore over-running will have begun at the clutch 84. The starter will accordingly decelerate to a position of rest, assuming completion of the powder burning action which has been proceeding in chamber 52.

As heretofore noted, various changes may be made in the structure, disposition, and inter-relationship of the component elements, as well as in the size and number thereof, within the scope of the appended claims.

If preferred, the valve control shown in Fig. 4 may be replaced by that shown in Fig. 6, the latter having the same function but being somewhat different in structure and disposition. As shown in Fig. 6, the valve 129 has a head whose tapered side is held seated upon the correspondingly tapered end surface of the valve housing 130; the valve being held against its seat by the pressure of the gases generated in chamber 52 and passing through opening 131 in the transverse wall 49, on their way to the entrance chamber 8 adjacent the nozzle ring 10 whose venturis 9 feed the turbo-rotor (Fig. 1). Valve housing 130 has a portion 132 of larger inner diameter, housing a piston 128, and having a passage 26 leading thereto from a connecting passage 25 which communicates with the space around plunger 21 (Fig. 1) in the same manner as does passage 25 of Fig. 1; the operation of plunger 21 being the same as in Fig. 1. A cover plate 133 and gasket 134 seal the piston housing 132, but the annular space 135 is vented to the lower pressure (exhaust) chamber 35 by way of outlet port 136; the chamber 35 being in effect a part of exhaust manifold 15 (Figs. 1 and 3). This vent 136 therefore relieves any high pressure created in annular chamber 135 by leakage of high pressure gases past piston 128. Such leakage may possibly occur, although the fit of piston 128 in housing 132 is a fairly tight, sliding fit, as is that of valve 129 in housing 130.

With the structure of Fig. 6 substituted for that of Fig. 4, the operation will be substantially the same as previously described; that is, unseating of ball valve 20 (Fig. 1) will allow high pressure gases to collect behind piston 128, by way of the space around plunger 21 (Fig. 1) which feeds such gases to passages 25 and 26 (Fig. 6) just as in the structure of Fig. 1. The pressure thus exerted on piston 128 exceeds—due to the greater diameter of piston 128, in comparison with the head of valve 129—the opposing pressure exerted from chamber 52 upon the head of valve 129, and the result therefore is a rightward motion of both members 128 and 129, until the latter is caused to seat itself on the circular edge of opening 131 in wall 49. This seating of the valve in wall 49 cuts off all further flow of gas to the venturis 9, as the only path thereto is by way of opening 131 and chamber 8. This cutting off therefore prevents any further speed rise; and as the speed begins to fall off, valve 20 will be re-seated, as heretofore explained. Re-seating of valve 20 (Fig. 1) cuts off any further flow of gas into the passage 25 (Fig. 6) and also permits exhaust of the pressure behind piston 128; the exhaust being by way of passages 26 and 25 and the rear of plunger 21, leading to low pressure chamber 35, as heretofore explained with reference to the operation of the structure shown in Fig. 4.

The release of the pressure behind piston 128 produces an unbalancing, due to the higher pressure in chamber 52, wherein the powder burning action continues to cause pressure build-up; and this unbalancing therefore acts to return members 129 and 128 to their opposite positions, that is, the positions illustrated in Fig. 6. Flow of gas to the venturis 9, by way of opening 131 and chamber 8, is accordingly resumed, so that the cycle may be repeated as heretofore explained.

Other changes, additions, or substitutions may be made within the scope of the claims. For example, conventional safety releases of the frangible disc type, or its equivalent, may be added to supplement the pressure control constituted by valves 31 (Fig. 1). Also, a positioning detent or detents may be provided to hold the powder containers 42 (Fig. 2) properly aligned with opening 44 during insertion of each successively inserted powder stick. Other modifications will be possible, without departing from the actual teaching herein disclosed.

What is claimed is:

1. A prime mover comprising a housing having a turbine rotor journaled therein, said rotor having a series of blades about its periphery, a multi-chambered fuel carrier within said housing, means for rotating said fuel carrier about the axis of said rotor to bring the several chambers successively into fuel-receiving position, means for simultaneously igniting the fuel in all chambers of said fuel carrier to cause generation of pressure-exerting gases within said housing, and means for directing said pressure-exerting gases against said rotor blades.

2. A prime mover as defined in claim 1, wherein said igniting means includes a smaller fuel carrier detached and apart from said first-named fuel carrier, and supported on an outer surface of said housing, and means for directing gases generated by the burning of fuel in said smaller fuel carrier against the forward face of the fuel in each chamber of said fuel carrier, simultaneously, to cause ignition thereof.

3. A prime mover as defined in claim 1, including a gear train driven by said rotor to multiply the torque developed in said rotor, said gear train having an orbital gear concentric with and supported by said housing.

ROMEO M. NARDONE.

REFERENCES CITED

The following references are of record in the file of this patent:

UNITED STATES PATENTS

| Number | Name | Date |
|---|---|---|
| 1,935,123 | Lansing | Nov. 14, 1933 |
| 2,005,913 | Coffman | June 25, 1935 |
| 2,140,083 | Lansing | Dec. 13, 1938 |
| 2,172,124 | Gilbert | Sept. 5, 1939 |
| 2,204,437 | Nardone | June 11, 1940 |
| 2,411,552 | New | Nov. 26, 1946 |
| 2,447,200 | Miller | Aug. 17, 1948 |
| 2,457,833 | Redding | Jan. 4, 1949 |
| 2,465,099 | Johnson | Mar. 22, 1949 |
| 2,470,162 | Goehmann | May 17, 1949 |